3,139,387
PREPARATION OF (+)-THREO-12,13-DI-
HYDROXYOLEIC ACID
William E. Scott, Levittown, Charles F. Krewson, Abington, and Roy W. Riemenschneider, Glenside, Pa., assignors to the United States of America as represented by the Secretary of Agriculture
No Drawing. Filed Oct. 29, 1962, Ser. No. 233,972
3 Claims. (Cl. 195—30)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of (+)-threo-12,13-dihydroxyoleic acid.

Polyfunctional fatty acids, such as the dihydroxy, monounsaturated fatty acid of the present invention, are useful as intermediates in the preparation of plasticizers, surface-active agents, modified drying oils, high molecular weight polymers, or may be oxidatively degraded to compounds such as aldehydes and discarboxylic acids.

We have discovered that incubation of freshly ground *Vernonia anthelmintica* (L.) Willd. seed under an inert atmosphere such as nitrogen results not only in hydrolytic cleavage of the glyceride to give free vernolic acid, but quite unexpectedly yields (+)-threo-12,13-dihydroxyoleic acid.

Since the dihydroxyoleic acid is not normally present in extracts of the same lot of seed, the formation of (+)-threo-12,13-dihydroxyoleic acid is apparently due to a reaction which is specific to the conditions provided in the present process and is attributed to hydration of the epoxy function of vernolic acid. The hydration may be an enzymatic process because an optical isomer rather than a racemic mixture is produced.

In general according to the present invention (+)-threo-12,13-dihydroxyoleic acid is obtained by a process comprising crushing *Vernonia anthelmintica* seed, incubating the freshly ground seed at a temperature of at least about 20° C. in an inert atmosphere and in the presence of moisture, extracting the incubated ground seed with a physical fat solvent, that is, a solvent which does not react chemically with the solute, to obtain an extract containing (+)-threo-12,13-dihydroxyoleic acid, and separating (+)-threo-12,13-dihydroxyoleic acid from the extract.

The seed is ground, flaked or otherwise crushed immediately prior to the incubation period so that changes which occur in an atmosphere of air are minimized. These changes include inactivation of enzymes considered favorable to the process of the present invention, activation of competing enzymatic reactions, growth of aerobic microorganisms, etc.

While the process was operated at a temperature of 28° C., somewhat higher or lower temperatures may be employed. Below about 20° C. the product is formed, but at a rate too slow to be considered practical. Higher temperatures than that exemplified would tend to accelerate the process.

Some dihydroxyoleic acid is produced when the ground seed is incubated with the moisture level that of the amount contained in the seed. An increase in available moisture definitely accelerates the reaction and increases the yield of dihydroxyoleic acid, as subsequently shown by comparison of Examples 1 and 2.

The incubation conditions of moisture and temperature are, under aerobic conditions, conducive to growth of many aerobic microorganisms. The growth of molds and other microorganisms interferes with subsequent handling of the incubated meal and end use of extracted meal. The effect of hydrogen or other gases on the yield of a dihydroxyoleic acid or other product has not been evaluated. Accordingly, we prefer to conduct the incubation in an inert atmosphere, for which purpose nitrogen is a readily available material.

The dihydroxyoleic acid can be extracted from the incubated ground seed with any of the typical fat solvents. This can be a ketone, such as acetone or methyl ethyl ketone; simple esters such as ethyl acetate; lower alcohols; hydrocarbons; or chlorinated hydrocarbons. Preferred solvents for extraction are ethyl ether, petroleum ether, or mixtures thereof. The latter solvents give an extract with a minimum of impurities.

Separation of the product from impurities in achieved by conventional crystallization techniques, employing activated charcoal to adsorb impurities and crystallizing from fat solvents at low temperatures. Other separation procedures such as chromatographic can also be applied.

A further means of separating the product from the extract is to convert fatty acids to their heavy metal salts, for example the barium or cadmium salts, separating the salts from the glycerides, converting the salts to free fatty acids, and crystallizing dihydroxyoleic acid from the mixture of fatty acids.

The following examples are presented to illustrate the practice of the present invention, but are not intended to be in limitation thereof.

*Example 1*

Freshly ground *Vernonia anthelmintica* seed, 1996 gm. (moisture free basis), was incubated at 28° C. for two weeks in a water-saturated nitrogen atmosphere. The incubated meal was exhaustively extracted, first with petroleum ether (B.P. 39–59° C.) and then with ethyl ether. The extracts contained 390 gm. of oil. Crystallizations from petroleum ether-ethyl ether at 0° C., ethyl acetate at 0° C., decolorization with activated carbon in acetone followed by crystallization from acetone at −20° C., and finally from acetone at 22° C., gave 36.2 gm. of (+)-threo-12,13-dihydroxyoleic acid. This is a yield of 1.8% based on dry weight of the seed and represents 9.3% of the weight of the oil. The product was characterized as follows: M.P. 63–63.3° C.; $[\alpha]_D^{27}$ +19.0° (c., 10 in EtOH); oxirane content, none. Analysis: C, 69.1; H, 10:8%. (Calc. for $C_{18}H_{34}O_4$: C, 68.8; H, 10.9%.)

*Example 2*

Ground seed, 605.8 gms. with 9.2% moisture content, or 550 gm. on a moisture free basis, was admixed with 1200 ml. water and incubated at 28° C. under nitrogen. During each 24-hour period the mixture was agitated for about 8 hours and allowed to stand for about 16 hours. After one week the incubated mixture was extracted and the (+)-threo-12,13-dihydroxyoleic acid separated in a manner similar to that described in Example 1 to give 34.5 gm. of product. This is a yield of 6.3% based on dry weight of seed and about 32% of the weight of extracted oil.

As a further substantiation of identification of the product the optical isomer (−)-threo-12,13-dihydroxyoleic acid was prepared from vernolic acid by chemical procedures (acetolysis). Thin layer chromatography of the methyl esters of the (+) and (−) isomers of the threo-12,13-dihydroxyoleic acids produced single spots having the same migratory characteristics. Infrared spectra of the methyl esters of the isomers were identical, each showing the typical pattern for an unsaturated dihydroxy ester having the cis configuration at the double bond.

We claim:

1. A process for preparing (+)-threo-12,13-dihydroxyoleic acid comprising grinding *Vernonia anthelmintica* seed, incubating the freshly ground seed at a temperature of at least about 20° C. in an inert atmosphere and in the presence of moisture, extracting the incubated ground seed with a fat solvent to obtain an extract containing (+)-threo-12,13-dihydroxyoleic acid, and separating (+)-threo-12,13-dihydroxyoleic acid from the extract.

2. The process of claim 1 in which the moisture is provided by the ground seed and by inclusion in the inert atmosphere.

3. The process of claim 1 in which the moisture is provided by the ground seed and by water admixed with the ground seed.

References Cited in the file of this patent

Scott et al.: J.O.C.S., October 1963, vol. 40. No. 10, pp. 587–599.